United States Patent [19]

Wuidart

[11] Patent Number: 5,948,102

[45] Date of Patent: Sep. 7, 1999

[54] METHOD AND DEVICE TO IMPROVE THE SECURITY OF AN INTEGRATED CIRCUIT

[76] Inventor: Sylvie Wuidart, Le Cade 12, 83910 Pourrières, France

[21] Appl. No.: 08/574,231

[22] Filed: Dec. 18, 1995

[30] Foreign Application Priority Data

Dec. 19, 1994 [FR] France ................... 94 15269

[51] Int. Cl.$^6$ .................................................. G06F 11/00
[52] U.S. Cl. .................................................. 713/200
[58] Field of Search .................. 395/186, 878, 395/845, 859, 872, 550, 825, 250, 478, 481, 494, 838, 837, 187.01, 839, 188.01; 380/3, 4, 23, 25

[56] References Cited

U.S. PATENT DOCUMENTS

| | | | |
|---|---|---|---|
| 3,334,333 | 8/1967 | Gunderson et al. | 340/172.5 |
| 4,221,931 | 9/1980 | Seiler | 179/1.5 R |
| 4,672,365 | 6/1987 | Gehman et al. | 340/539 |
| 4,734,680 | 3/1988 | Gehman et al. | 340/539 |
| 4,984,195 | 1/1991 | Nakamura et al. | 364/200 |
| 5,081,457 | 1/1992 | Motisher et al. | 342/40 |
| 5,214,423 | 5/1993 | Antoniou | 340/825.5 |
| 5,258,656 | 11/1993 | Pawlick | 307/141 |
| 5,450,492 | 9/1995 | Hook et al. | 380/28 |
| 5,465,349 | 11/1995 | Geronimi et al. | 395/184.01 |
| 5,535,418 | 7/1996 | Suzuki | 395/845 |
| 5,548,787 | 8/1996 | Okamura | 395/845 |
| 5,548,797 | 8/1996 | Arimilli et al. | 395/880 |
| 5,564,015 | 10/1996 | Bunnell | 395/184.01 |

FOREIGN PATENT DOCUMENTS

| | | | |
|---|---|---|---|
| A-0 314 148 | 5/1989 | European Pat. Off. | G07F 7/10 |
| A-0 481 881 | 4/1992 | European Pat. Off. | G07F 7/10 |
| A-0 482 975 | 4/1992 | European Pat. Off. | G06K 19/06 |
| A-2 513 408 | 9/1981 | France | G06F 7/01 |
| A-2 580 834 | 10/1986 | France | G06F 12/14 |
| 1 397 412 | 6/1975 | United Kingdom . | |

*Primary Examiner*—Robert W. Beausoliel, Jr.
*Assistant Examiner*—Scott T. Baderman

[57] ABSTRACT

Disclosed is a method and apparatus to increase the security of an integrated circuit, the integrated circuit including at least one microprocessor, one or more security sensors to detect abnormal conditions of operation, and registers accessible by the microprocessor which store a state of a respective sensor. The microprocessor reads the contents of a register only at the end of a random period where the duration of the random period is determined by a number generated by a random number generator.

14 Claims, 1 Drawing Sheet

METHOD AND DEVICE TO IMPROVE THE SECURITY OF AN INTEGRATED CIRCUIT

BACKGROUND OF THE INVENTION

1. Field of the Invention

The invention relates to a method and a device used to improve the security of an integrated circuit which can be applied especially to Integrated Circuit (IC) cards for which protection must be provided against all attempts at fraudulent use. These are, for example, cards used in banking applications or cards used for controlling access to protected premises. For these applications, integrated circuits have at least one microprocessor and a volatile memory containing confidential information. The information should not be damaged or retrieved by fraudulent action.

2. Description of the Related Art

To this end, there are many security sensors designed to detect abnormal operating conditions in order to prohibit the operation of the integrated circuit.

Thus, among the sensors designed, there is a sensor to detect excessively low frequencies (an excessively low frequency makes it easier to spy on internal operations), a sensor to detect excessively high voltage or excessively low voltage (because an excessively high or excessively low voltage may degrade the contents of the memory cells that are read or written in), a sensor to detect excessively high or excessively low temperatures and a depassivation or light sensor.

The security sensors each deliver a binary signal whose state indicates a normal operation or an anomaly. These binary signals are used to secure the integrated circuit.

The binary signals may directly trigger a physical protection system, for example, the locking of the clock, enforced permanent initialization or other similar systems.

The binary signals may also be used in the context of a software protection system. A storage register is then associated with each of the sensors. The different registers are sampled by the microprocessor which decides to take account or not take account of the different alarms and, as the case may be, decides on the action to be undertaken: namely re-initialization, locking, destruction of confidential data, etc.

The registers are generally of a monostable type. The detection of an alarm makes them flip over and only a secured reinitialization procedure, managed by the microprocessor, can reset them to an initial state.

The sensors could be managed by means of program interruptions where the flipping over of a register of a sensor prompts a microprocessor interruption, with a corresponding program for the management of the interruption. In practice, however, the microprocessor interruption signals are not as numerous, and they are reserved for other uses.

It is therefore preferred to carry out a sequential operation of the sensors under software control. Such an operation makes it possible to set up degrees of security depending on the applications and also makes it possible to manage false alarms.

This sequential approach is more flexible since it makes it possible to avoid systematic locking operations. The state of the sensors is then controlled sequentially, during the performance of the different instructions in the software program. It has been noticed, however, that the sequential use of the states of the sensors could be subverted in a fraudulent manner.

Indeed, if a fraudulent individual is capable of determining the different instructions sequentially performed by the microprocessor, he or she could manage to determine the precise moment in the sequence when the state of one or more of the sensors is read. For a given operation (for example, turning on the voltage, waiting for an operator's instruction, performing reading operation or a programming or verification of an identification code), since these are sequential instructions, this moment is always the same.

All that would be needed then would be to ensure that there are normal conditions before or just when the state of the sensor is read, and to modify these conditions just afterwards. When the microprocessor reads the sensors, the corresponding conditions would appear to be normal. The microprocessor therefore continues normal performance. But in fact, the operating conditions are changed just afterwards and are no longer "normal".

It has therefore been observed that the sequential use of the state of the sensors, which is admittedly more flexible than an operation by interruption, could nevertheless make it possible to bypass the checking of the security sensors. After the reading of the sensor or sensors, subsequent changes are not seen by the microprocessor so long as it does not perform a new check. Now, it is not possible to read these sensors continuously, for the progress of the programs would be excessively slowed down. Generally, a reading is done at initialization and at least once at an appropriate time for each subprogram, for example, just before a strategic operation.

An object of the invention is to secure the process of checking the security sensors. If it is possible to prevent the determining of the moment or moments when the sensors are read, then it will be far more difficult to manage to impose abnormal conditions on the integrated circuit without this being detected by the microprocessor.

SUMMARY OF THE INVENTION

The invention therefore relates to a method for increasing the security of an integrated circuit comprising at least one microprocessor and one or more security sensors to detect abnormal conditions of operation, registers accessible by the microprocessor being designed to each store a state of a respective sensor.

According to the invention, the method consists of, for at least one of the registers, when the microprocessor receives an instruction to read this register, the microprocessor implements this reading operation only at the end of a random period of time after receiving the instruction. Whenever the microprocessor has to read the register, it fixes a random value to initialize a counting loop and counts through the loop before implementing the reading operation.

The invention also relates to a device for the implementation of such a method, comprising a pseudo-random generator coupled to the microprocessor.

BRIEF DESCRIPTION OF THE DRAWINGS

Other features and advantages are specified in the following description, given by way of an indication that does not restrict the scope of the invention and with respect to the appended drawings, of which.

DETAILED DESCRIPTION

Figure 1:
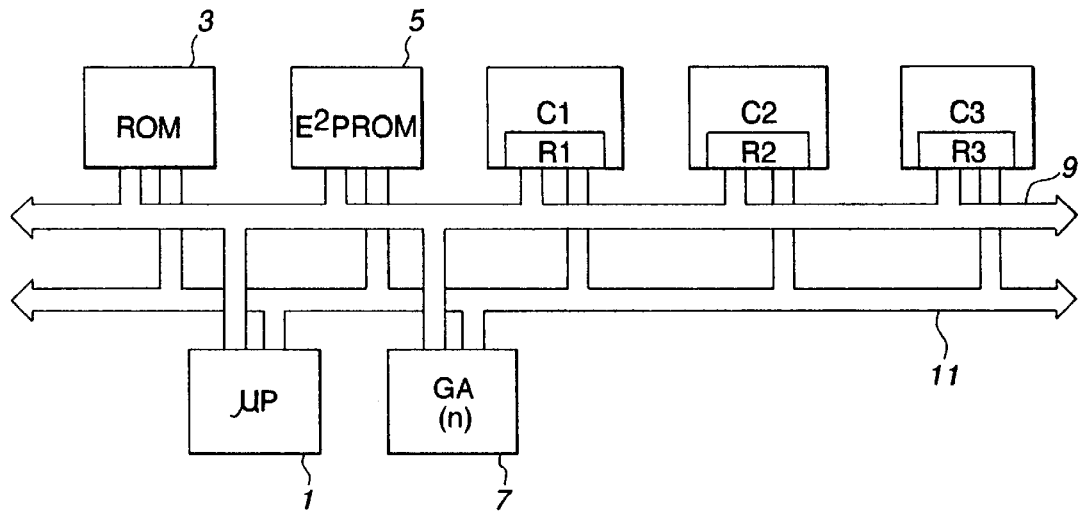
FIG. 1 is a functional block diagram of an integrated circuit used in relation to a device according to the present invention.

According to the invention, and as shown in FIG. 1, an integrated circuit comprises a microprocessor $\mu P$ 1, a program memory ROM 3, a non-volatile memory 5, for example of the E²PROM type, and security sensors C1, C2, C3 to detect abnormal operating conditions. As shown in FIG. 1, C1 detects an excessively high temperature, C2 detects an excessively low frequency and C3 detects an excessively high supply voltage. It has been seen further above that other sensors in addition to these could be designed to detect a depassivation or excessively low temperature or voltage, etc. These sensors are commonly used and are well known to those skilled in the art. Their manufacture shall therefore not be given in detail.

These sensors C1, C2, C3 deliver a binary logic information element indicating normal operation or an alarm as the case may be. This information element is stored in a register that is read by the microprocessor 1. As shown in FIG. 1, registers R1, R2, R3 are associated with sensors C1, C2, C3, respectively. The registers R1, R2, R3 are accessible by the microprocessor 1.

According to the invention, the integrated circuit includes a pseudo-random generator GA 7 to provide a random value n upon a command issued by the microprocessor 1. The microprocessor 1, ROM 3, E²PROM 5, random number generator GA 7 and sensors C1, C2, C3 and associated registers are all commonly connected to an I/O bus 9. In order to provide fault-tolerance, a second I/O bus 11 is also provided in the event of a failure of I/O bus 9. The microprocessor 1 can therefore access the contents of the ROM 3, E²PROM 5 and receive a random number generated by GA 7.

When the microprocessor 1 performs a subprogram in response to an initialization signal or an external command and executes an internal instruction to test a sensor, the microprocessor 1 starts by asking for a value n from the pseudo-random generator GA 7 to initialize a counting loop. When the number n has been counted out (at the rate of the instruction cycle of the microprocessor), the microprocessor 1 reads the register of the sensor to process the value in the register according to a program for the management of anomalies.

If the integrated circuit has several sensors, the microprocessor may apply this method to all the sensors or only to some of them. The microprocessor 1 applies the method at least to the first sensor tested sequentially. In the example shown in FIG. 2 of a sequence for testing the sensors, this method is applied to the sensors C1 and C3 of FIG. 1, not to the sensor C2.

Figure 2:
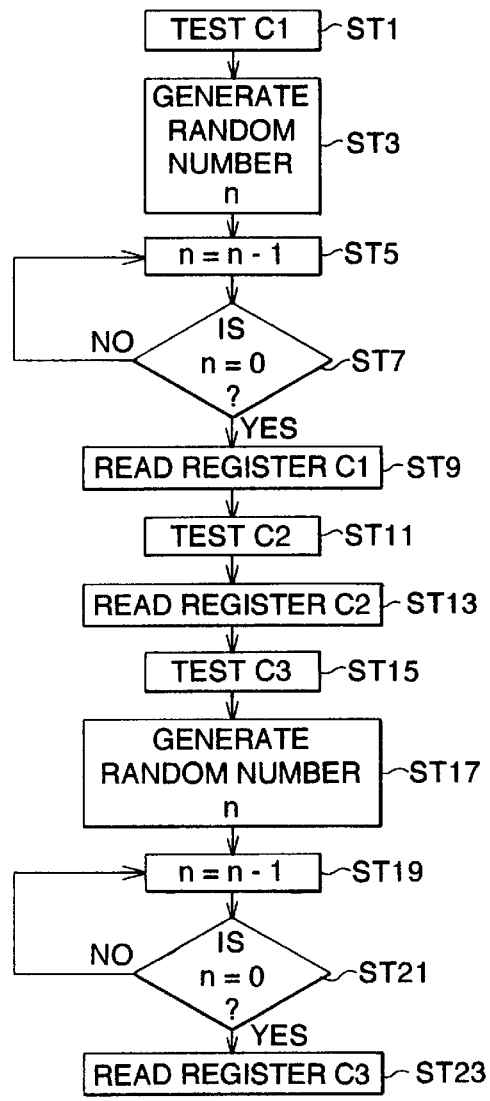
FIG. 2 is a flow chart corresponding to a method according to the invention.

As shown in FIG. 2, at step ST1 the microprocessor 1 receives an instruction to test sensor C1. At a next step ST3, a random number n is generated. A number n of microprocessor clock cycles is counted. As shown in step ST5, the number n is decreased by one for each clock cycle. The value of n is checked at step ST7 and if the value is not zero, program flow returns to step ST5. If the value is zero, the register of sensor C1 is read at step ST9. As discussed above, the random delay does not need to be applied to the reading of each of the sensors. As also shown in FIG. 2, when an instruction is received requesting a reading of sensor C2, as at step ST11, the microprocessor immediately reads the value in the register associated with sensor C2 without waiting for a randomly determined period of time. In steps ST15–ST23, sensor C3 and the associated register are read in a manner similar to that disclosed above in regard to sensor C1 and steps ST1–ST9.

One of ordinary skill would see that step ST5 could also be performed as a counting up from zero to a time n. Counting up from zero to a time n and counting down from time n to zero are equivalent ways to measure a duration n. In addition, the duration has been described as n number of clock cycles. The number n could also represent other units of time such as seconds. The duration could then be measured by a real time clock or other equivalent means at the disposal of the microprocessor. This is all understood by one of ordinary skill in the art.

In this way, a random period is introduced into the sequential program. This makes it difficult to determine the time when the sensors are read. However, the duration of the program is lengthened.

It is therefore necessary, depending on the degree of security sought, to assess the delay that can be accepted in the performance of the program. For example, it is possible to determine a range of the random number as a function of the nature of the sensor to be tested. If maximum security is desired, the method of the invention is applied to all the sensors of the integrated circuit.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A method for increasing the security of an integrated circuit including at least one microprocessor and one or more security sensors to detect one or more abnormal conditions of operation, one or more registers associated with the sensors to store a state of the corresponding sensor, and each register accessible by the at least one microprocessor, the method comprising the steps of:

initiating a pseudo-random number generator coupled to the at least one microprocessor, the pseudo-random number generator generating a pseudo-random number n;

the at least one microprocessor receiving an instruction to carry out a reading operation of at least one register;

delaying the at least one microprocessor a randomly determined period of time after receiving the reading operation instruction; and the at least one microprocessor implementing the reading operation of the at least one register after the randomly determined period of time, wherein said determined period of time is a function of the pseudo-random number n.

2. The method according to claim 1 wherein, the delaying step includes the steps of:

initializing a counting loop with the random number n; and counting through the counting loop before implementing the reading operation.

3. The method according to claim 1, wherein the method is performed for each instruction to carry out a reading operation on each of the one or more registers.

4. An apparatus with increased security of operation comprising:

a microprocessor;

a pseudo-random number generator coupled to the microprocessor, the pseudo-random number generator generating a pseudo-random number n;

at least one sensing device coupled to the microprocessor, the at least one sensing device sensing an operating condition of the apparatus and outputting an operating condition signal representing a state of the sensor;

wherein the microprocessor reads the operating condition signal a determined period of time after the microprocessor receives an instruction to read the sensor, said determined period of time being a function of the pseudo-random number n, and determines whether the apparatus is secure based upon the read operating condition signal.

5. The apparatus as recited in claim 4, wherein:

the at least one sensing device includes a register which stores the operating condition signal.

6. The apparatus as recited in claim 5, wherein:

the operating condition signal is a binary signal.

7. The apparatus as recited in claim 4, wherein:

the period of time is approximately n microprocessor clock periods.

8. A method for increasing the security of an integrated circuit including a microprocessor and a sensor coupled to the microprocessor, the sensor to sense an operating condition and having an associated register to store a state of the corresponding sensor, the method comprising the steps of:

continuously sensing an operating condition;

storing a value representing the continuously sensed operating condition;

initiating a pseudo-random number generator coupled to the microprocessor, the pseudo-random number generator to generate a pseudo-random number n;

starting an operation to retrieve the stored value via the microprocessor;

the microprocessor retrieving the stored value at a randomly determined time after starting the operation to retrieve the stored value, said determined period of time being a function of the pseudo-random number n; and continuing operation only if the stored value is valid for operation.

9. The method as recited in claim 8, further comprising the step of:

setting a maximum value of the randomly determined time depending upon the operating condition being sensed.

10. A method for increasing security of an apparatus including a microprocessor and a sensor coupled to the microprocessor, the sensor sensing an operating condition and having an associated register for storing a state value of the sensor, the method comprising the steps of:

initiating a pseudo-random number generator coupled to the microprocessor, the pseudo-random number generator generating a pseudo-random number n;

instructing the microprocessor to retrieve the stored state value of the sensor from the associated register; and retrieving, with the microprocessor, the stored state value at a randomly determined time after the microprocessor receives the instruction to retrieve the stored state value, said determined period of time being a function of the pseudo-random number n.

11. A method for increasing security of an apparatus including a microprocessor and a sensor which senses an operating condition, said sensor coupled to the microprocessor, the sensor outputting a value representing the operating condition, the method comprising the steps of:

initiating a pseudo-random number generator coupled to the microprocessor, the pseudo-random number generator generating a pseudo-random number n;

instructing the microprocessor to retrieve the value representing the operating condition; and retrieving, with the microprocessor, the value at a randomly determined time after the microprocessor receives the instruction to retrieve the value, said determined time being a function of the pseudo-random number n.

12. An integrated circuit card comprising:

a microprocessor;

a pseudo-random number generator coupled to the microprocessor, the pseudo-random number generator generating a pseudo-random number n; and at least one sensing device coupled to the microprocessor, the at least one sensing device sensing an operating condition of the integrated circuit card and outputting an operating condition signal representing a state of the sensor;

wherein the microprocessor reads the operating condition signal a determined period of time after the microprocessor receives an instruction to read the sensor, said determined period of time being a function of the pseudo-random number n and the microprocessor determines whether the integrated circuit card is secure based upon the read operating condition signal.

13. An apparatus with increased security of operation comprising:

a processing means for executing a set of instructions;

a random number generating means for generating a random number n, the random number generating means coupled to the processing means; and a sensing means for sensing an operating condition of the apparatus and for outputting an operating condition signal, the sensing means coupled to the processing means; wherein the processing means reads the operating condition signal a determined period of time after the processing means receives an instruction to read the sensing means, said determined period of time being a function of the random number n; and whereby the processing means determines whether the apparatus is secure based upon the read operating condition signal.

14. The apparatus as recited in claim 13, wherein the sensing means comprises a storing means for storing the operating condition signal.

* * * * *

UNITED STATES PATENT AND TRADEMARK OFFICE
CERTIFICATE OF CORRECTION

PATENT NO. : 5,948,102
DATED : September 7, 1999
INVENTOR(S) : Sylvie Wuidart

It is certified that error appears in the above-indentified patent and that said Letters Patent is hereby corrected as shown below:

On the title page, item [73] should read:

Assignee: SGS-Thomson Microelectronics S.A., Gentilly, France

The Attorney, Agent, or Firm section should read:

Wolf, Greenfield & Sacks, P.C.; James H. Morris; Theodore E. Galanthay

Signed and Sealed this

Sixth Day of March, 2001

*Attest:*

NICHOLAS P. GODICI

*Attesting Officer*     Acting Director of the United States Patent and Trademark Office